(12) United States Patent
Nyboer et al.

(10) Patent No.: US 9,560,798 B2
(45) Date of Patent: Feb. 7, 2017

(54) MULCHING APPARATUS FOR A LAWNMOWER

(71) Applicant: Paul Howard Nyboer, Hamilton, MI (US)

(72) Inventors: Paul Howard Nyboer, Hamilton, MI (US); Matthew Paul Nyboer, Hamilton, MI (US); Nicholas G. Hayhoe, Holland, MI (US)

(73) Assignee: Paul Howard Nyboer, Hamilton, MI (US)

( * ) Notice: Subject to any disclaimer, the term of this patent is extended or adjusted under 35 U.S.C. 154(b) by 481 days.

(21) Appl. No.: 14/087,012

(22) Filed: Nov. 22, 2013

(65) Prior Publication Data
US 2015/0143790 A1 May 28, 2015

(51) Int. Cl.
*A01D 67/00* (2006.01)
*A01D 34/00* (2006.01)

(52) U.S. Cl.
CPC .................... *A01D 34/005* (2013.01)

(58) Field of Classification Search
CPC .... A01D 34/005; A01D 34/03; A01D 34/125; A01D 34/81; A01D 2101/00
USPC ...................... 56/320.2, 13.5–13.8, 13.3, 203
See application file for complete search history.

(56) References Cited

U.S. PATENT DOCUMENTS

| | | | |
|---|---|---|---|
| 2,517,855 A | 8/1950 | Elliott et al. | |
| 3,188,787 A * | 6/1965 | Weiland | A01D 34/81 56/16.5 |
| 3,531,923 A | 10/1970 | DeLay | |
| 3,664,097 A * | 5/1972 | Pedigo | A01D 43/0633 100/145 |
| 3,846,963 A * | 11/1974 | Pedigo | A01D 34/49 56/13.2 |
| 3,925,968 A | 12/1975 | Wagenhals | |
| 4,114,353 A * | 9/1978 | Ansbaugh | A01D 43/077 56/13.3 |
| 4,199,926 A | 4/1980 | Petty | |
| 4,263,771 A * | 4/1981 | Iaboni | A01D 34/005 56/13.4 |
| 4,379,385 A * | 4/1983 | Reinhall | A01D 43/0633 56/16.6 |
| 4,741,148 A | 5/1988 | Ekas, Sr. et al. | |

(Continued)

*Primary Examiner* — Thomas B Will
*Assistant Examiner* — Joan D Misa
(74) *Attorney, Agent, or Firm* — Warner Norcross & Judd LLP

(57) ABSTRACT

A mulching device for attachment to a lawnmower includes a cutting assembly separate from the mower blades, wherein the grass clippings are finely cut and then dispersed onto the ground surface. In one embodiment, the cutting assembly includes an auger that compresses the grass clippings prior to cutting them. The mulching device may also include a separation chamber for separating the grass clippings from the forced air exiting the mower deck, so that the grass clippings may be cut in an environment separate from the forced air. In another embodiment, the mulching device includes a dispersion assembly for spreading the cut grass clippings onto a ground surface. The dispersion assembly may include a chute extending from the forced air outlet to a position adjacent the cutting assembly, wherein the forced air exiting the separation chamber is directed onto the cut grass clippings to disperse the cut grass clippings onto the ground surface.

20 Claims, 7 Drawing Sheets

(56) References Cited

U.S. PATENT DOCUMENTS

| | | | | |
|---|---|---|---|---|
| 5,020,309 A * | 6/1991 | Hopkins | ............... | A01D 42/005 |
| | | | | 15/330 |
| 5,070,683 A * | 12/1991 | Eggenmueller | ...... | A01D 34/005 |
| | | | | 56/13.8 |
| 5,129,217 A | 7/1992 | Loehr | | |
| 5,189,868 A * | 3/1993 | Hill | ....................... | B02C 18/144 |
| | | | | 241/292.1 |
| 5,191,756 A | 3/1993 | Kuhn | | |
| 5,199,251 A | 4/1993 | Rouse et al. | | |
| 5,240,188 A * | 8/1993 | Whitmire | ............... | A01G 3/002 |
| | | | | 241/101.2 |
| 5,428,864 A * | 7/1995 | Pemberton | ............... | B30B 9/301 |
| | | | | 15/339 |
| 5,485,715 A * | 1/1996 | Breeden | ............... | A01D 34/005 |
| | | | | 56/13.3 |
| 5,491,964 A | 2/1996 | Butler | | |
| 5,613,353 A * | 3/1997 | Kugler | ................. | A01D 42/005 |
| | | | | 56/12.7 |
| 5,626,008 A | 5/1997 | Puszkar | | |
| 5,960,619 A | 10/1999 | Seidel et al. | | |
| 5,987,863 A | 11/1999 | Busboom et al. | | |
| 6,016,644 A * | 1/2000 | Specht | ................. | A01D 43/006 |
| | | | | 56/1 |
| 6,065,276 A | 5/2000 | Hohnl et al. | | |
| 6,089,006 A * | 7/2000 | Langford | ........... | A01D 43/0631 |
| | | | | 56/13.3 |
| 6,644,003 B1 * | 11/2003 | Bass | ....................... | A01G 3/002 |
| | | | | 56/12.8 |
| 6,826,896 B1 * | 12/2004 | Liao | ....................... | A01D 43/08 |
| | | | | 56/17.5 |
| 7,065,946 B2 | 6/2006 | Boeck et al. | | |
| 7,837,751 B2 * | 11/2010 | Dunning | ............... | A01G 1/125 |
| | | | | 15/340.3 |
| 8,122,697 B1 * | 2/2012 | Clemens | ............... | A01D 51/00 |
| | | | | 56/16.6 |

\* cited by examiner

MULCHING APPARATUS FOR A LAWNMOWER

BACKGROUND OF THE INVENTION

The present invention relates to lawnmowers, and more particularly to a mulching device that can be attached to a lawnmower for cutting (i.e., "mulching") the grass clippings in a manner that they can be deposited onto the ground surface.

As is generally known, lawnmowers include a mower deck that houses one or more rotating blades for cutting grass. The loose pieces of grass that have been cut by the lawnmower blades are often referred to as grass clippings.

Difficulties often arise with the disposal of grass clippings. Depositing or blowing grass clippings directly onto the ground surface can be unsightly, especially when the grass clippings are wet or particularly long, because they may clump and/or rest on top of the grass. As a result, commercial and residential lawn mowers alike generally use one of two recognized methods for disposing of grass clippings, which include: (1) collecting the grass clippings in one or more bags or other containers, or (2) re-cutting or "mulching" the grass clippings into smaller pieces that can be deposited onto the ground surface in a manner that is less visible than directly dropping the grass clippings.

Unfortunately, both of these known methods can be problematic. Collecting the grass clippings is generally done with a bagging attachment that includes a chute connected between the mower deck and one or more containers. The bagging attachment utilizes the forced air produced by the spinning mower blades, and/or an additional blower, to blow the grass clippings through the chute and into the one or more containers. Even when these bagging attachments work correctly, they are troublesome in that they require additional time for the operator to interrupt the mowing process and empty the containers, and they require a separate location for dumping the collected clippings. And in many cases, these bagging attachments fail due to the clippings clogging in the mower deck, chute or containers.

Mulching can also be problematic. Most mulching mowers re-cut the grass clippings within the mower deck by containing the grass clippings within the mower deck and using a combination of special blades and forced air to cut and re-cut the grass clippings within the mower deck. The re-cut (i.e., "mulched") grass clippings eventually drop onto the ground surface in a smaller, and thus less unsightly, form. Unfortunately, these mulching arrangements generally only work under ideal conditions where the grass is dry and not too long. Wet grass, or particularly long grass, often clogs within the mower deck, is not re-cut as desired, and falls onto the ground surface in unwanted clumps.

SUMMARY OF THE INVENTION

The present invention provides a mulching device for attachment to a lawnmower. The mulching device includes a cutting assembly separate from the mower blades of the lawnmower, wherein the grass clippings, leaves, thatch and other yard waste can be consistently finely cut and then dispersed onto the ground surface.

In one embodiment, the mulching device includes a chute adapted to be attached to the lawnmower for receiving the grass clippings from the lawnmower. The cutting assembly is connected to the chute, the cutting assembly receiving grass clippings from the chute, and including at least one cutting blade—separate from the mower blades—configured to cut the grass clippings received from the lawnmower. The device further includes an outlet that receives the cut grass clippings from the cutting assembly and disperses the cut grass clippings onto the ground surface.

The cutting assembly may be configured to compress the grass clippings prior to cutting them. This compression may provide a degree of consistency and uniformity to the re-cutting of the grass clippings. In one embodiment, the cutting assembly includes an auger with a first end and a second end, and a tube forming a compression chamber therein. The second end of the auger may extend into the compression chamber, such that the auger forces the grass clippings into the compression chamber and compresses the grass clippings in the chamber. The cutting blade may be positioned within the compression chamber, or adjacent to the compression chamber to cut the compressed grass clippings into smaller pieces. In a further embodiment, the helical auger blade may converge at the second end to further aid in compressing the grass clippings.

In one embodiment, the mulching device includes a separation chamber for separating the grass clippings from the forced air exiting the mower deck. This separation can isolate the grass clippings for purposes of cutting. The separation chamber may define an inlet, a grass clippings outlet at the bottom of the chamber and a forced air outlet spaced from the grass clippings outlet. The grass clippings and forced air may be directed to swirl about the sidewall of the chamber in a vortex pattern until the grass clippings fall through the grass clippings outlet and the forced air flows up the center of the vortex and out the forced air outlet. The cutting assembly is positioned adjacent the grass clippings outlet.

In another embodiment, the mulching device includes a dispersion assembly for spreading the cut grass clippings onto the ground surface. The dispersion assembly may include a chute extending from the forced air outlet to a position adjacent the cutting assembly, wherein the forced air exiting the separation chamber is directed onto the cut grass clippings to blow, and thus disperse, the cut grass clippings onto the ground surface. The dispersion assembly may also include a plurality of mechanical dividers adjacent the dispersion chute, the forced air blowing the cut grass clippings over the mechanical dividers to further disperse the cut grass clippings.

The present invention also includes a method for mulching grass clippings comprising the steps of: (a) providing a cutting assembly for attaching to a lawnmower having a mower deck containing at least one mower blade, the mower blade operable to rotate to thereby cut grass into grass clippings, the rotating mower blade and/or a separate blower also producing a supply of forced air, the cutting assembly including a cutting blade separate from the mower blade; transporting the grass clippings from the mower blade to the cutting assembly; (b) cutting the grass clippings in the cutting assembly with the cutting blade; and (c) dispersing the cut grass clippings onto the ground surface.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

I. Overview

Figure 1:
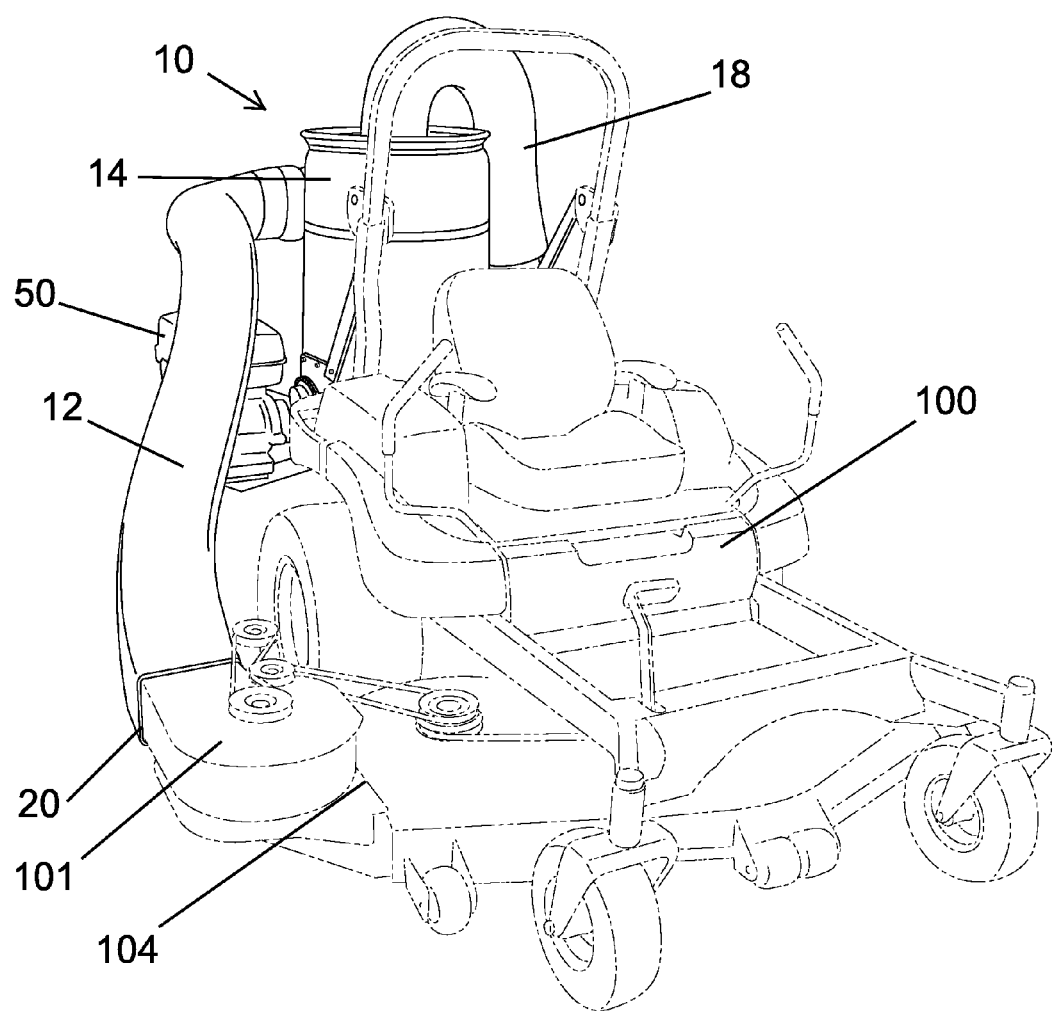
FIG. 1 is a perspective view of a mulching apparatus attached to a lawnmower according to one embodiment of the present invention.

A mulching apparatus for a lawnmower according to one embodiment of the present invention is shown in FIGS. 1-8 and generally designated 10. In the illustrated embodiment, the mulching apparatus 10 is attached to a lawnmower 100 (shown in broken lines), such that grass clippings, leaves, thatch and other yard waste exiting the lawnmower 100 are directed into the mulching apparatus 10, cut into smaller pieces, and then outputted onto the ground surface. The mulching apparatus 10 generally includes an transportation chute 12, a separation chamber 14, a cutting assembly 16 and a dispersion assembly 18.

Grass clippings exiting the lawnmower 100 may be routed into the chute 12 and then into the separation chamber 14, wherein the clippings are further routed into the cutting assembly 16 and then re-cut in a cutting operation separate from the lawnmower blade cutting operation. The re-cut grass clippings exit the cutting assembly 16 and are dispersed onto the ground surface. Throughout this description, directional terms, such as "vertical," "horizontal," "top," "bottom," "upper," "lower," "inner," "inwardly," "outer" and "outwardly," may be used to assist in describing the invention based on the orientation of the embodiments shown in the illustrations. The use of directional terms should not be interpreted to limit the invention to any specific orientation(s).

II. Structure

A mulching apparatus according to the present invention may be designed to attach to a variety of types of conventional lawnmowers including, but not limited to, commercial lawnmowers, residential riding lawnmowers and lawn tractors, and walk-behind lawnmowers. In the illustrated embodiment, the mulching apparatus 10 is shown in connection with a conventional commercial riding lawnmower 100. Because it is conventional, the lawnmower will not be described in detail. Suffice it to say that in general, lawnmowers include a mower deck 102 mounted to the lawnmower 100. The mower deck 102 houses one or more rotating blades that can be actuated to cut grass as the lawnmower moves over the ground surface. The cut grass is generally referred to in this application as "grass clippings" which are generally designated 11 in FIG. 3. Many lawnmowers include a port 104 on the mower deck—often an opening on the side of the mower deck—that can be opened to allow the grass clippings to exit the mower deck 102. In the illustrated embodiment, the lawnmower 100 further includes a blower 101 connected to the mower deck 102 at the port 104 to supplement the forced air of the mower blades, such that the rotating blade(s) and/or the blower 101 form a forced air system. The force of the rotating blade or blades and/or the blower 101 acts to blow the grass clippings out of the port 104. This forced air exiting the mower deck 102 is represented by arrow A in FIG. 3. Although the size, shape and structure of various types of lawnmowers may be different, each lawnmower generally includes a structural location where a mulching apparatus such as the current invention can be mounted or attached. It should be appreciated that the size, shape and arrangement of the mulching apparatus components may be altered to accommodate the size, shape and power of the particular type of lawnmower to which it is attached. For example, the components of a mulching assembly 10 for attachment to residential riding lawnmower or walk-behind lawnmower—although consistent in structure and function to those of the illustrated embodiment—may be smaller and more compact than those shown in the illustrated embodiment in connection with a commercial lawnmower 100.

The transportation chute 12 routes grass clippings 11 exiting the mower deck 102 and/or blower 101 into the mulching apparatus 10. Thus, instead of directly disposing the grass clippings onto the ground surface or into a bagging apparatus, the chute 12 causes grass clippings to flow into the separate mulching apparatus 10 attached to the lawnmower 100. The chute 12 may take a variety of shapes and forms, depending on the type of mower to which it is attached. In one embodiment, the chute 12 may be the same as or similar to a chute designed for use with a conventional bagging apparatus. In general, the chute 12 extends between the mower deck 102 and/or blower 101 and the separation chamber 14. In the illustrated embodiment, the chute 12 is elongated and includes a first end 20 attached to the blower 101 and a second end 22 attached to the separation chamber 14 (which is described in more detail below). In an embodiment with no blower 101, the first end 20 may attach directly to the exit port 104 of the mower deck 102 In one embodiment, the chute 12 may utilize the forced air A created by the mower blades and/or blower 101 to force the grass clippings 11 through the chute 12 from the first end 20 to the second end 22. In one embodiment, a chute 12 may not be necessary, as the separation chamber 14 and/or cutting assembly 16 may be directly connected to the mower deck 102.

Figure 2:
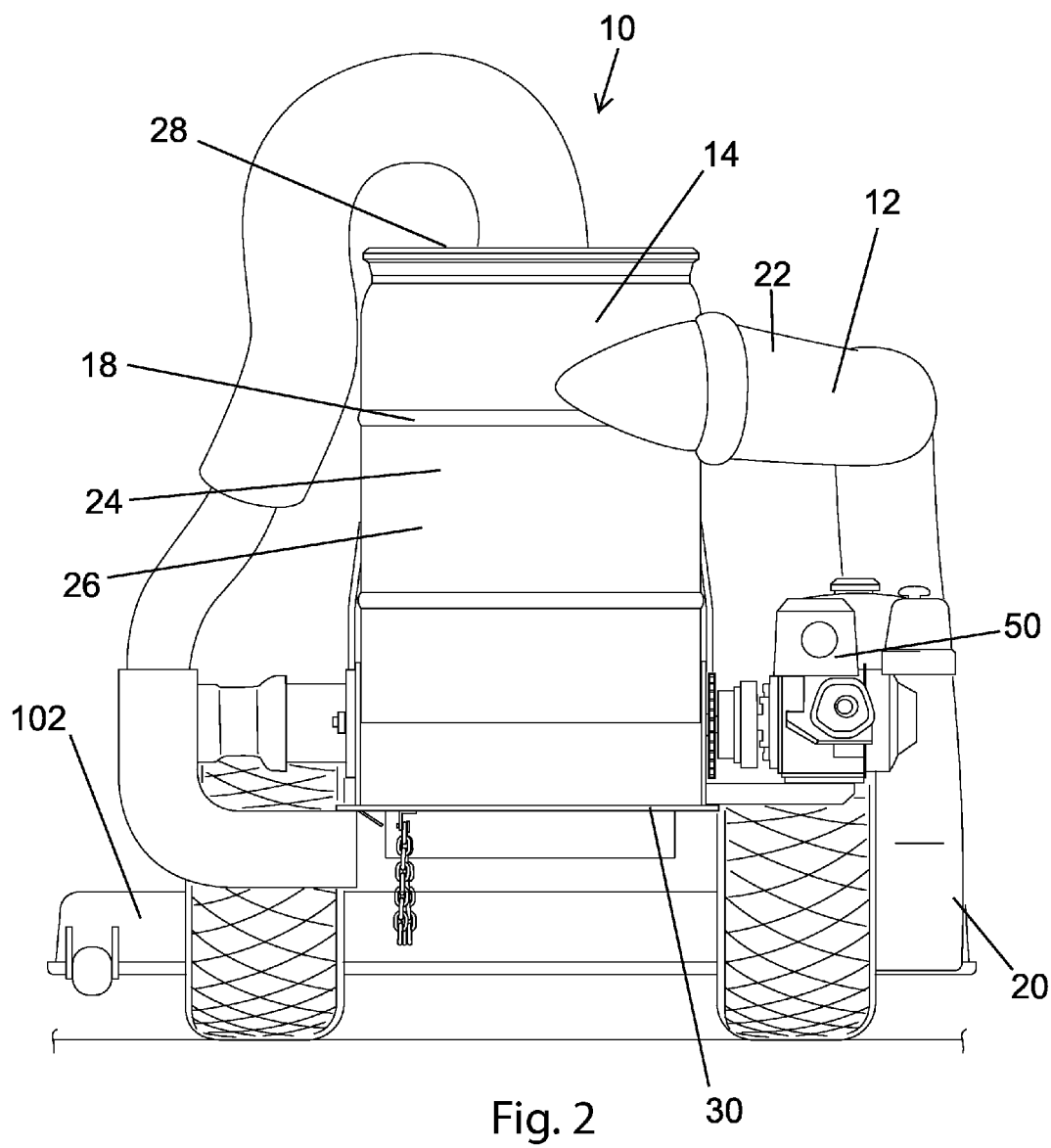
FIG. 2 is a rear view thereof.
Figure 3:
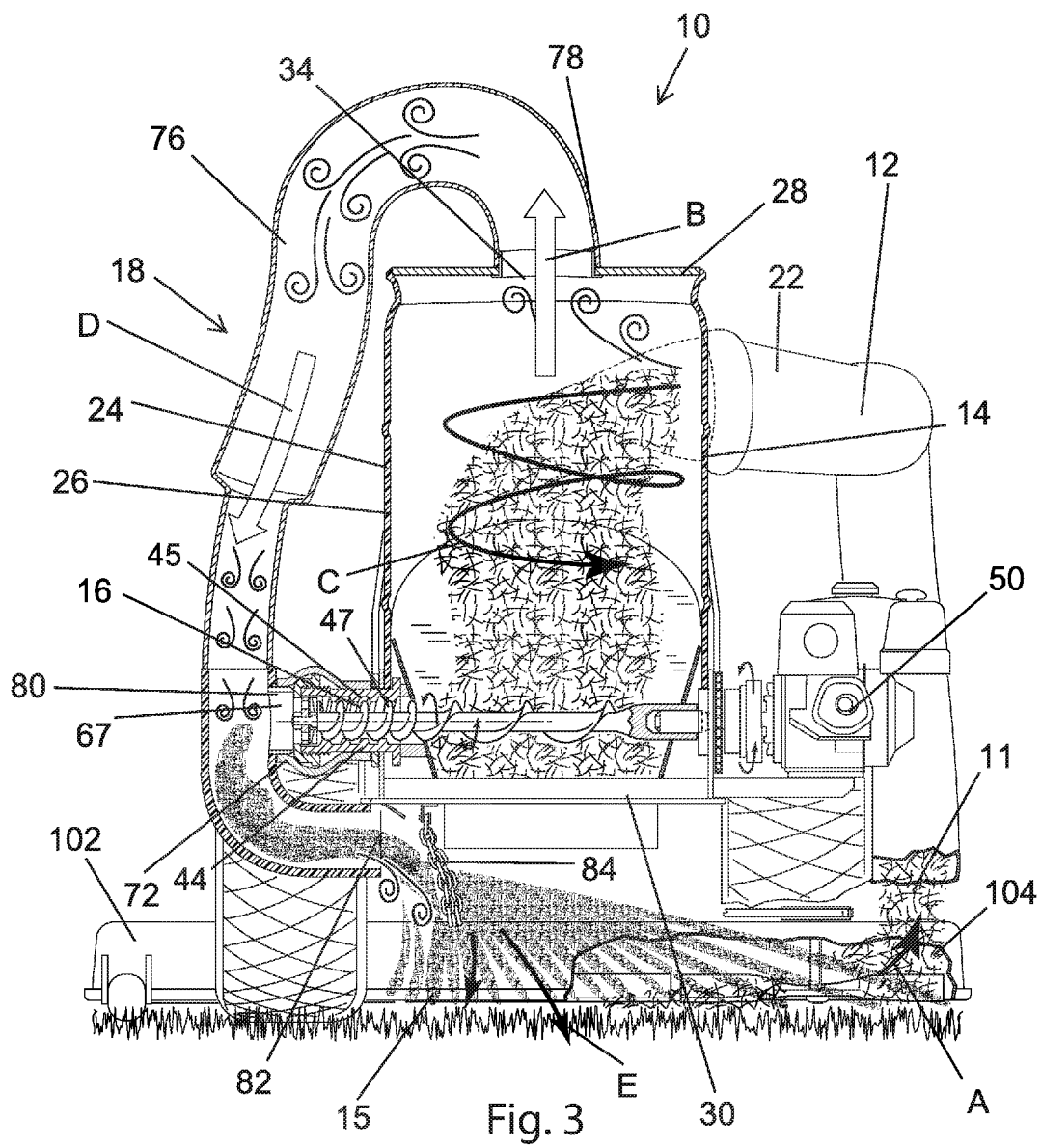
FIG. 3 is a rear view thereof with portions of the mulching apparatus shown in section to illustrate the grass clippings flow path.
Figure 4:
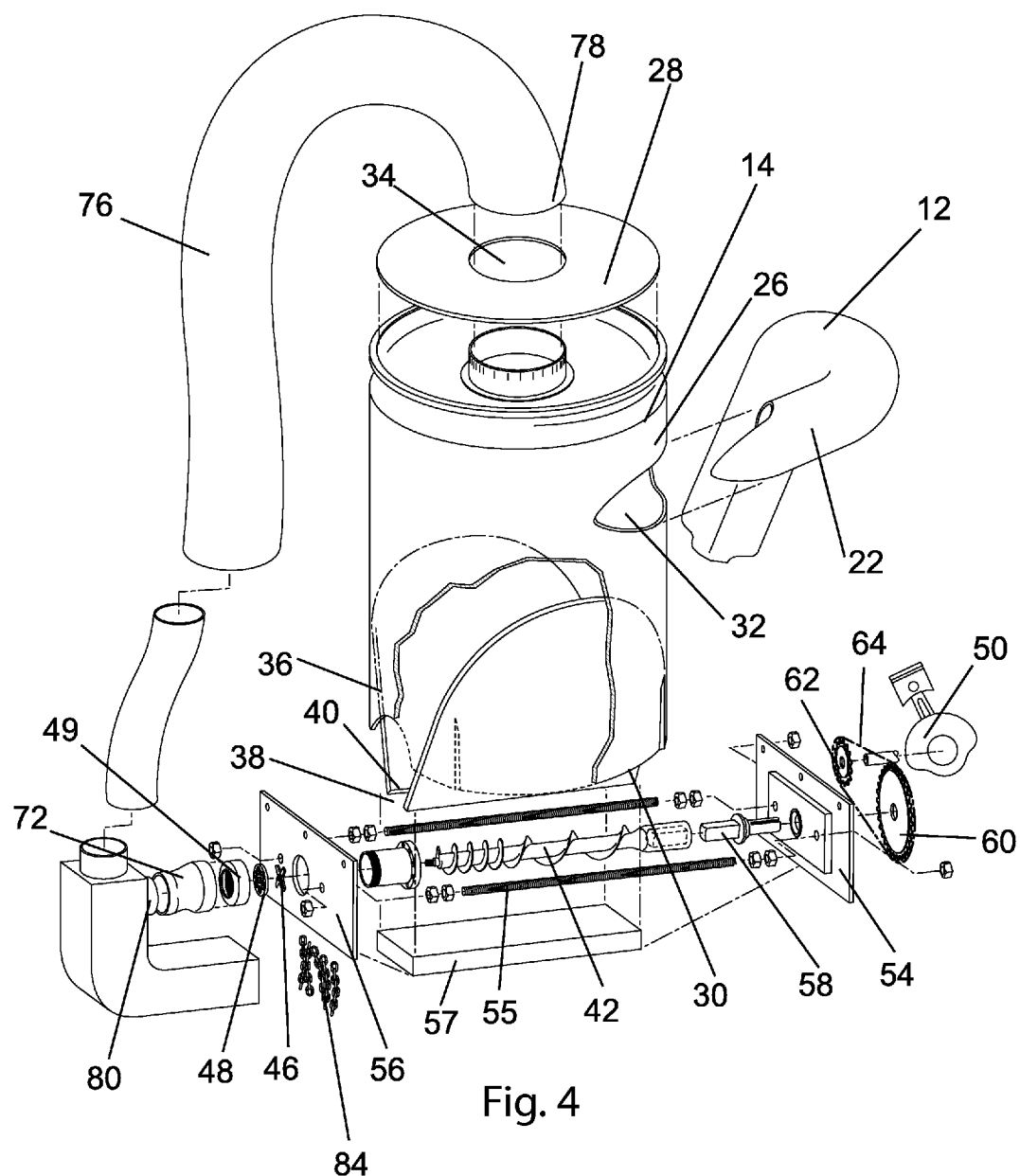
FIG. 4 is an exploded view of a mulching apparatus according to one embodiment of the present invention.
Figure 5:
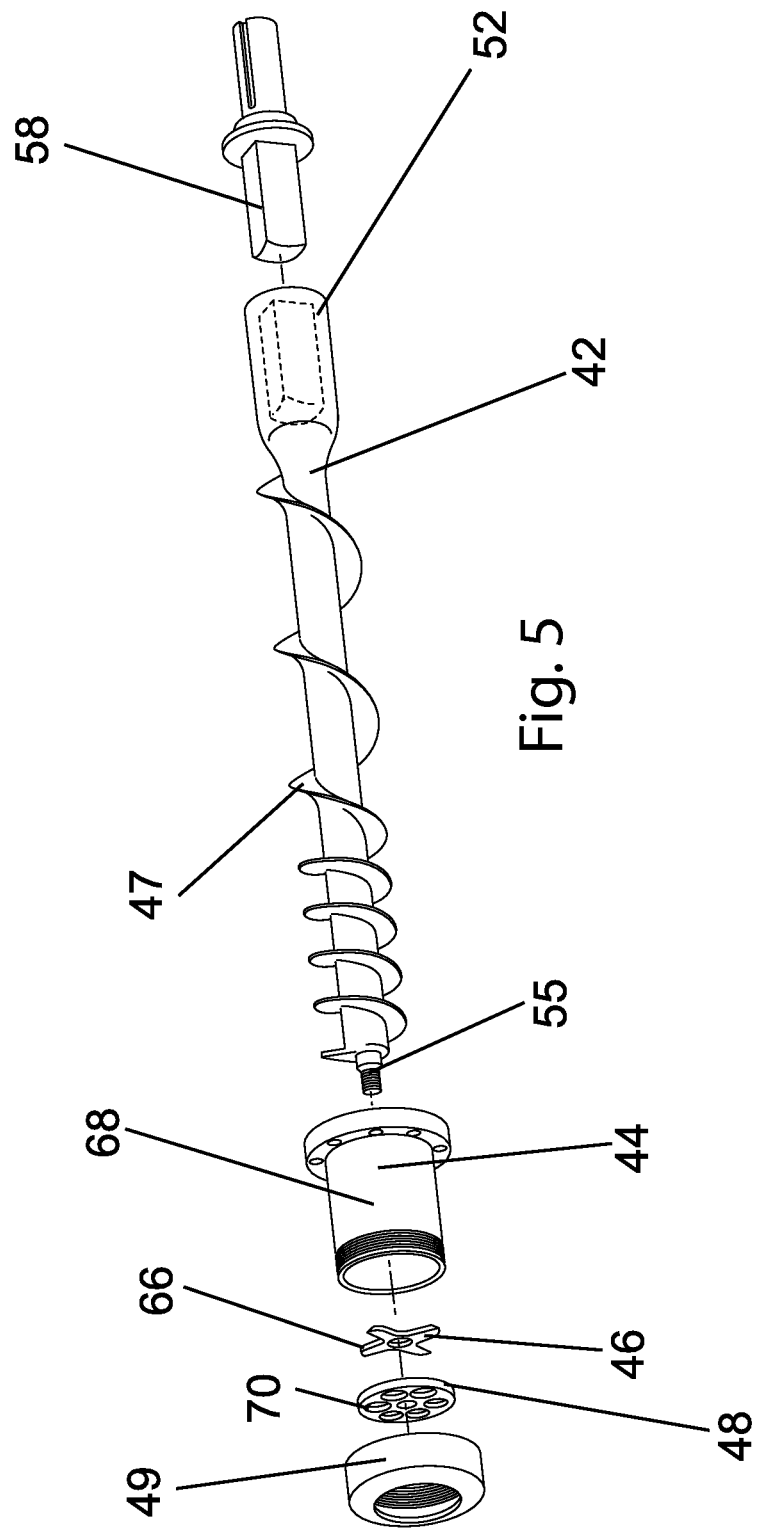
FIG. 5 is a close up exploded view of a cutting assembly according to one embodiment of the present invention.

The separation chamber 14 directs grass clippings into the cutting assembly 16, and also directs the forced air from the chute into the dispersion assembly 18. The forced air exiting the separation chamber 14 is designated at arrow B and described in more detail below. Thus, the grass clippings 11 are separated from the forced air such that the cutting assembly 16 can re-cut the grass clippings 11 in an operation separate from the forced air, and the forced air B can be routed to disperse the re-cut grass. Put another way, the grass clippings 11 and forced air A are combined when entering the separation chamber 14, then separated from one another during the cutting operation, and then re-introduced to one another after the cutting operation to disperse the re-cut grass 15 onto the ground surface. Referring to FIGS. 2 and 3, in the illustrated embodiment, the separation chamber 14 is formed by a cylindrical container 24 having a sidewall 26, an upper end 28 and a bottom 30. In one embodiment, the second end 22 of the chute 12 is connected to the container 24 at an input opening 32 in the sidewall 26. As shown in FIGS. 3 and 4, the opening 32 may be radially offset so that the forced air and grass clippings entering the separation chamber 14 are caused to flow in a vortex pattern (designed by arrow C) around the inside of the sidewall 26 as they fall toward the bottom 30. The flow of the grass clippings 11 and air in this vortex pattern C may prevent the clippings from piling up at one location on the bottom of the chamber 14 by dispersing the grass clippings across the diameter of the chamber 14 as they flow through the chamber 14. The upper end 28 of the separation chamber 14 may define a forced air exit opening 34 that enables the forced air B to exit the chamber 14. As shown in FIG. 3, the forced air generally follows the vortex pattern C as it enters the chamber 14, and then flows upwardly through the center of the chamber approximately along a centerline of the chamber 14 and out through the exit opening 34 in the direction of arrow B. As shown in FIG. 4, the bottom 30 of the container 24 is configured to include the cutting assembly 16. In the illustrated embodiment, the interior of the sidewall 26 includes a pair of panels 36 that converge toward each other approaching the bottom 30 of the container 24 to funnel the falling grass clippings toward the center of the container 24. A grass clippings exit 38 opening is formed between the lower edges 40 of the panels 36. Although the separation chamber 14 is illustrated as a cylindrical container with an input opening creating a vortex, other methods of directing the grass clippings into a cutting assembly may also be used.

Figure 6:
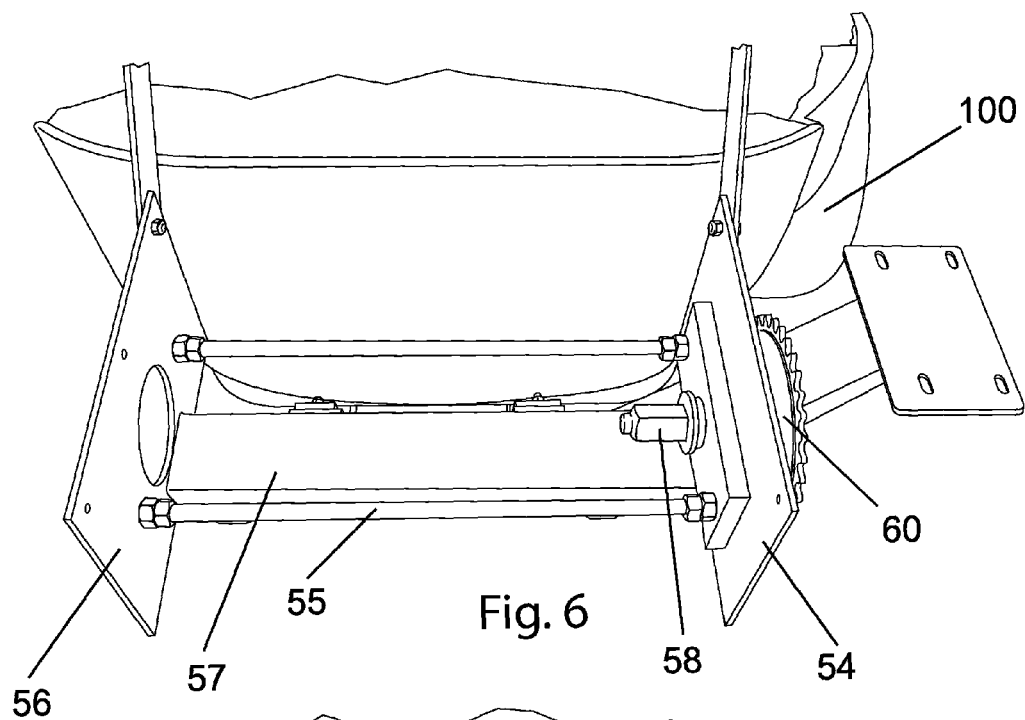
FIG. 6 is a partially assembled view of a portion of the mulching apparatus according to one embodiment.
Figure 7:
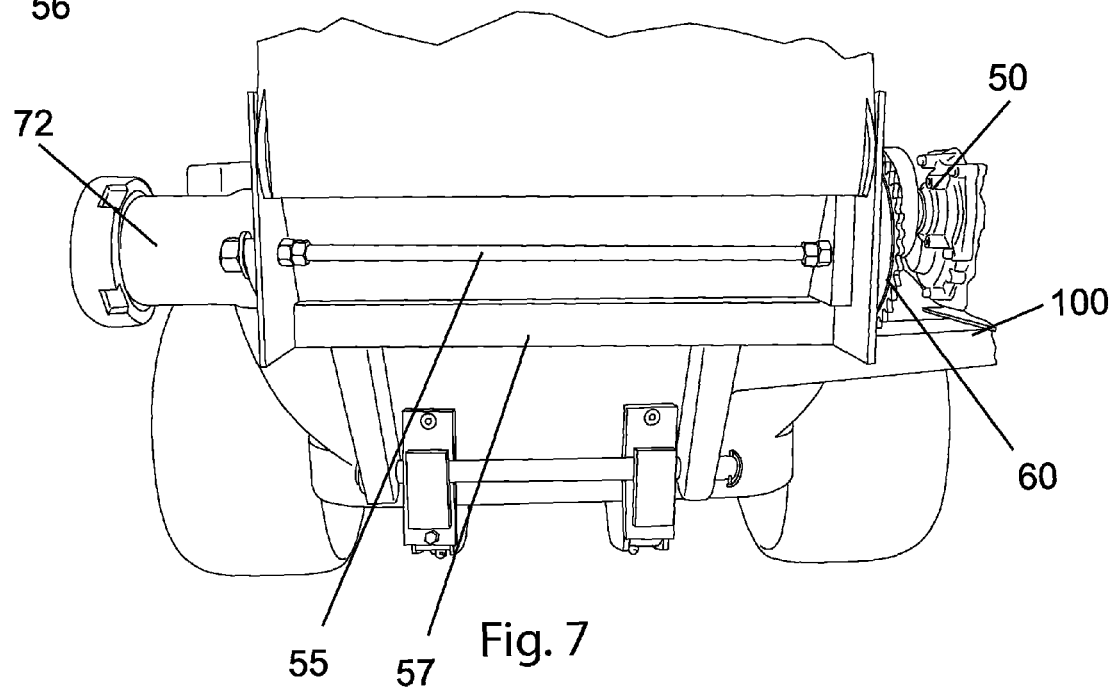
FIG. 7 is another partially assembled view of a portion of the mulching apparatus according to one embodiment.

The cutting assembly 16 provides a system for re-cutting the grass clippings in an operation separate from the initial cut within the mower deck 102. In one embodiment, the cutting assembly 16 is designed to cut the grass clippings by compressing the clippings into a compression cutting chamber 44 and forcing them through at least one cutting blade. In the illustrated embodiment, the cutting assembly 16—or at least a portion thereof—is positioned below the grass clippings exit opening 38, and includes an auger 42, a cutting chamber 44, a blade 46, a stationary plate 48 and a cap 49. The auger 42 is driven to rotate about a central axis. In the illustrated embodiment, the auger 42 includes a first end 52 supported by a first support plate 54 and a second end 55 extending through a second support plate 56. Referring to FIGS. 6 and 7, support rods 55 and a mounting bracket 57 hold the cutting assembly 16 in place. As shown, the first end 52 of the auger 42 includes a drive shaft 58. A drive gear 60 is mounted on the drive shaft 58 such that the drive gear 60 rotates with the drive shaft 58 about the central axis. In the illustrated embodiment, the drive gear 60 is connected to a motor gear 62 with a drive belt or chain 64. The motor gear 62 is connected to a secondary motor 50, which may be a convention gasoline motor mounted onto the lawnmower 100 in a conventional manner. Operation of the secondary motor 50 causes the auger 42 to rotate about the central axis. The auger 42 may be driven by a variety of conventional methods. Although the mulching apparatus 10 includes a secondary motor 50 powered separately from the lawnmower 100, it is quite possible that in other embodiments the auger 42 may be driven directly by the primary motor of the lawnmower 100, for instance, by an auxiliary drive shaft extending from the primary motor.

The second end 55 of the auger extends into the cutting chamber 44, which in the illustrated embodiment is formed by a cylindrical pipe 68 mounted to the second support plate 56 and partially closed with the cap 49 to form a mulching exit opening 67 in the separation chamber 14. The blade 46 may be mounted on the second end 55 of the auger 42 within the cutting chamber 44 such that the blade 46 rotates with the auger 42. In the illustrated embodiment, the blade 46 includes four spaced apart knife blades 66 extending outwardly from the central axis, although a variety of blade arrangements may be used. In addition, the stationary plate 48 is mounted on the second end 55 of the auger 42 within the cutting chamber 44. As shown, the stationary plate 48 includes a series of spaced apart holes 70 extending through the stationary plate 48. The shape, size and spacing of the holes 70 may be configured to maximize the flow rate of the re-cut grass clippings 15 through the stationary plate 48. In the illustrated embodiment, the plate 48 defines six circular holes of equal diameter spaced evenly apart about the plate 48. Alternatively, the holes 70 may vary in size and may have an oval, triangular, rectangular, square, or other desired shape. The stationary plate 48 may be mounted such that it remains stationary with respect to the blade 46 and auger 42. An output chute 72 may be attached to the end of the cutting chamber 44. In one embodiment, the output chute 72 is formed from a flexible material and extends over the cap 49 and a portion of the cutting chamber 44.

The dispersion assembly 18 operates to spread the re-cut grass clippings 15 as a mulch onto the ground surface. In one embodiment, the dispersion assembly 18 utilizes the forced air created by the mower blades and/or blower 101 to blow the re-cut grass 15 and spread it onto the ground surface. More particularly, the dispersion assembly 18 may include a dispersion chute or tube 76 having a first end 78 extending outwardly from the forced air exit opening 34 at the upper end 28 of the separation chamber 14, such that the forced air represented by arrow B exiting the separation chamber 14 flows through the dispersion chute 76. As shown in FIG. 3, the dispersion chute 76 is joined with the cutting assembly 16 output chute 72 at a junction 80, wherein the re-cut grass is combined with the forced air flowing through the dispersion chute 76 (represented by arrow D) and blown out of the second end 82 of the dispersion chute 76, which acts as an outlet. In the illustrated embodiment, a plurality of mechanical dividers, such as a series of chains 84, are attached to the mulching device 10 adjacent to the second end 82 of the dispersion chute 76. Dispersion chute 76 is illustrated as a multi-piece tube 76, however, in another embodiment the dispersion chute may be formed as a single piece.

Figure 8:
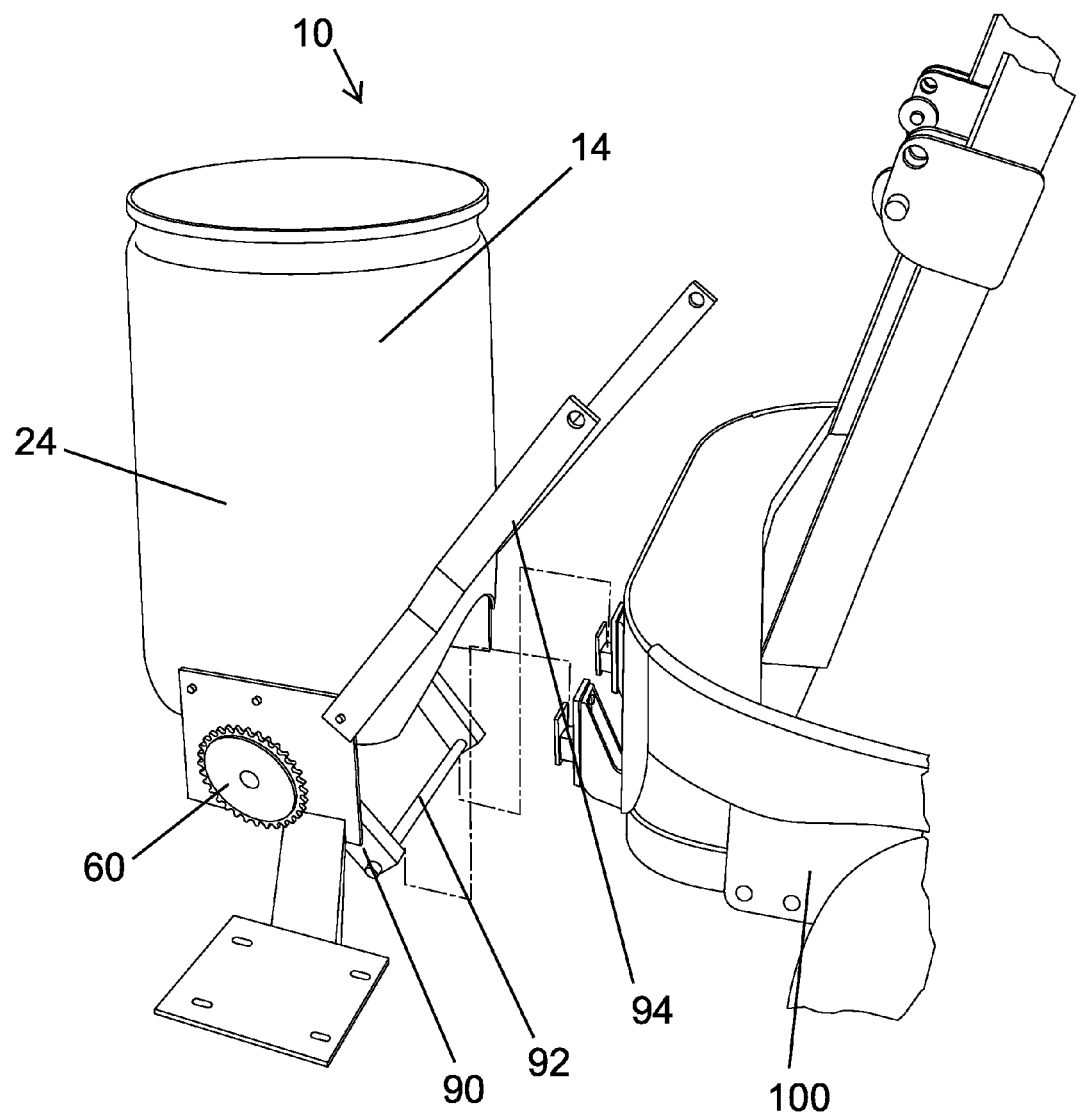
FIG. 8 is a side view showing one method for attaching a mulching apparatus to a lawnmower.

FIGS. 7 and 8 illustrated one example of the attachment of a mulching device 10 to a lawnmower 100. As shown the mulching device includes a pair of lower arms 90 connected by a cross-member 92 and a pair of upper arms 94. The arms 90, 94 are connected by conventional means to attachment structure on the lawnmower 100. Many other types of attachment systems may be used, depending on the arrangement of the mulching device and the configuration of the lawnmower.

III. Operation

Operation of the mulching apparatus 10 generally includes the steps of: (a) transporting grass clippings 11 from a lawnmower deck 102, (b) separating the grass clippings from the forced air created by the mower blades and/or blower 101, (c) cutting the grass clippings with a blade separate from the mower blades, and (d) dispersing the re-cut grass 15 (i.e., mulch) onto the ground surface.

In a more particular embodiment, the step of transporting the grass clippings may include providing a chute 12 connected between the mower deck 102 and/or blower 101 and a separation chamber 14. The grass clippings 11 may be transported through the chute via the forced air exiting the mower deck 102 and/or blower 101 (represented by arrow A). The step of separating the grass clippings 11 from the forced air may be accomplished by a variety of methods, including blowing the grass clippings into a chamber and letting the clippings fall into a cutting assembly 16. In the illustrated embodiment, the grass clippings 11 are blown into a cylindrical separation chamber 14, and enter the chamber 14 near the sidewall 26 of the chamber 14 such that the clippings 11 and the forced air flow into the chamber together in a vortex pattern (represented by arrow C). The flow of the vortex pattern spreads the grass clippings out across the diameter of the chamber 14 as they fall into the cutting assembly 16 at the bottom 30 of the chamber 14. The converging panels 36 at the bottom 30 of the chamber 14 act to funnel the falling grass clippings to the auger 42 of the cutting assembly 16.

The cutting assembly 16 operates to re-cut the grass clippings into small pieces such that they form a mulch 15 that can be dropped onto the ground surface generally without forming visible clumps or pieces of grass on the ground surface. In one embodiment, the cutting assembly 16 re-cuts or "mulches" the grass clippings in an environment separate from the forced air (for example, as a result of the separation chamber 14). This isolated cutting operation may enable a more controlled and finer cut of the grass clippings. Referring to FIG. 3, the grass clippings 11 fall into the rotating auger 42 and the auger forces the grass clippings into the cutting chamber 44. More particularly, the auger blades 47 near the cutting chamber 44 are spaced closer to one another, such that the grass clippings become compressed between the auger blades 47 and the wall of the cutting chamber 44 which includes at least one helical groove 45 formed therein that is configured to receive the auger blades 47. The compressed grass clippings are then forced through the blades 66 of the knife 46 and the plate 48 and cut into fine pieces that pass through the holes 70 in the plate 48. In one embodiment, the clippings are mulched into pieces that are between about 0.125" and 0.3125" long.

Finally, the mulch or "mulched clippings" 15 are dispersed onto the ground surface. In one embodiment, the mulched clippings are dispersed in such a way that there are no visible clumps or piles of mulched clippings on the ground surface. The mulched clippings may be dispersed by introducing them to a source of forced air, which, in one embodiment, includes reintroducing the mulched clippings to the forced air created by the mower blades and/or blower 101. In the illustrated embodiment, the forced air flow path is generally as follows: (1) forced air is created by the mower blades and/or blower 101 and blown with the grass clippings 11 out of the mower deck (represented by arrow A), (2) the air and clippings 11 are blown through the chute 12 to the separation chamber 14, (3) the air flows with the grass clippings into the separation chamber 14 and into a vortex flow pattern around the sidewall of the chamber (represented by arrow C), (4) after reaching the bottom of the chamber 14, the forced air separates from the grass clippings 11 and flows upwardly through the center of the vortex (along a line represented by arrow B), (5) the air is then routed through chute 76 (represented by arrow D) and passes to output chute 72 of the cutting assembly 16 at junction 80, wherein the forced air is combined with the re-cut grass clippings 15 and blows the small pieces of mulched grass 15 out of the second end 82 of the dispersion chute 76 in a direction generally represented by arrow E. As the mulch is blown from the chute 76, it may be directed over one or more mechanical dividers to further break up the mulched grass and force it to spread out over a wide flow path. As shown, the mulch is blown over the series of chains 84 are hanging from the mulching device 10 adjacent to the second end 82 of the dispersion chute 76.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A mulching device for attachment to a lawnmower having a mower deck and at least one lawnmower blade within the mower deck, the mulching device comprising:
   a chute adapted to be attached to the lawnmower for receiving grass clippings from the lawnmower;
   a cutting assembly connected to the chute, the cutting assembly including a compression chamber having an inlet at a first end for receiving grass clippings from said chute, an outlet at a second end of the compression chamber, and at least one helical groove formed in a wall of the compression chamber, and an auger extending into the compression chamber and configured to compress the grass clippings within the compression chamber, the cutting assembly including at least one cutting blade configured to cut the compressed grass clippings; and
   an outlet receiving the cut grass clippings from said cutting assembly and dispersing the cut grass clippings onto a ground surface.

2. The mulching device of claim 1 wherein said auger includes a first end and a second end, and a cylindrical tube forming the compression chamber therein, said second end of said auger extending into said cylindrical tube, said cutting blade adjacent said second end of said auger.

3. The mulching device of claim 2 wherein said auger includes an auger blade, said auger blade having windings wound around said auger, said windings converging approaching said second end of said auger.

4. The mulching device of claim 3 including a stationary plate adjacent said cutting blade, said stationary plate defining at least one opening through which the cut grass clippings can pass to the outlet.

5. The mulching device of claim 4 wherein said chute is adapted to be attached to the mower deck of the lawnmower, wherein said chute receives the grass clippings from the mower deck as well as forced air created by at least one of the lawnmower blade and a blower.

6. The mulching device of claim 5 including a separation chamber separating the grass clippings from the forced air, said separation chamber defining an inlet, a grass clippings outlet, and a forced air outlet spaced from said grass clippings outlet, said chute connected to said separation chamber at said inlet such that the forced air and grass clippings from the mower deck enter the separation chamber at said inlet, said cutting assembly adjacent said grass clippings outlet such that the grass clippings enter said separation chamber at said inlet and exit said separation chamber at said grass clippings outlet, wherein the grass clippings that exit said grass clippings outlet are received by said cutting assembly.

7. The mulching device of claim 6 wherein said separation chamber is formed by a cylindrical container having a sidewall, an upper end and a lower end, said inlet formed in said sidewall, said forced air outlet formed in said upper end and said grass clippings outlet formed in said lower end.

8. The mulching device of claim 7 including a dispersion assembly connecting said forced air outlet to said cutting assembly to direct the forced air exiting the separation chamber onto the cut grass clippings and thereby disperse the cut grass clippings onto the ground surface.

9. The mulching device of claim 8 wherein said dispersion assembly includes a dispersion chute extending from said forced air outlet to said cutting assembly.

10. The mulching device of claim 9 including a plurality of mechanical dividers adjacent said dispersion chute, the forced air blowing the cut grass clippings over said mechanical dividers to further disperse the cut grass clippings.

11. The mulching device of claim 3 wherein the at least one helical groove is configured to receive the auger blade.

12. A mulching device for attachment to a lawnmower having a mower deck and a mower blade, the mulching device comprising:
a cutting assembly separate from the mower blade, the cutting assembly receiving grass clippings cut by the mower blade, the cutting assembly including compression means for compressing and cutting the grass clippings, the compression means including a compression chamber having an inlet at a first end for receiving grass clippings, an outlet at a second end of the compression chamber, and at least one helical groove formed in a wall of the compression chamber, and an auger extending into the compression chamber,
wherein the grass clippings are compressed within the compression chamber, and wherein the cutting assembly is configured to cut the compressed grass clippings.

13. The mulching device of claim 12 wherein the cutting assembly includes a cutting blade positioned at least one of inside and adjacent to the compression chamber.

14. The mulching device of claim 13 wherein said auger includes an auger blade that converges approaching the compression chamber.

15. The mulching device of claim 14 wherein the at least one helical groove is configured to receive the auger blade.

16. The mulching device of claim 12 including a separation chamber and a forced air system, said forced air system directing forced air and grass clippings produced by the lawnmower into the separation chamber wherein the forced air is separated from the grass clippings.

17. The mulching device of claim 16 wherein said separation chamber includes a cylindrical container having an upper end, a lower end and a sidewall extending therebetween, said sidewall defining a forced air inlet receiving the forced air and grass clippings from at least one of the mower deck and a blower, said upper end defining a forced air outlet, said lower end defining a grass clippings outlet, said cutting assembly positioned adjacent said lower end.

18. The mulching device of claim 17 wherein said forced air system includes a chute connected to said forced air outlet and extending to a position adjacent said cutting assembly.

19. A mulching device for attachment to a lawnmower having a mower deck and at least one lawnmower blade within the mower deck, the mulching device comprising:
a chute adapted to be attached to the mower deck of the lawnmower for receiving grass clippings from the mower deck as well as forced air created by at least one of the lawnmower blade or a blower;
a cutting assembly connected to the chute, the cutting assembly receiving grass clippings from said chute, the cutting assembly including at least one cutting blade configured to cut the grass clippings received from the lawnmower;
compression means for compressing the grass clippings, said compression means including (a) an auger with a first end and a second end and (b) a cylindrical tube forming a compression chamber therein, the second end of said auger extending into said cylindrical tube, wherein said auger includes an auger blade, said auger blade having windings wound around said auger, said windings converging approaching said second end of said auger, and wherein said cutting blade is adjacent said second end of said auger and is configured to cut the compressed grass clippings;
a stationary plate adjacent said cutting blade, said stationary plate defining at least one opening through which the cut grass clippings can pass;
a separation chamber separating the grass clippings from the forced air, said separation chamber defining an inlet, a grass clippings outlet, and a forced air outlet spaced from said grass clippings outlet, said chute connected to said separation chamber at said inlet such that the forced air and grass clippings from the mower deck enter the separation chamber at said inlet, said cutting assembly adjacent said grass clippings outlet such that the grass clippings enter said separation chamber at said inlet and exit said separation chamber at said grass clippings outlet, wherein the grass clippings exiting the grass clippings outlet are received by said cutting assembly; and
an outlet receiving the cut grass clippings from said cutting assembly and dispersing the cut grass clippings onto a ground surface.

20. A mulching device for attachment to a lawnmower having a mower deck and a mower blade, the mulching device comprising:

a cutting assembly separate from the mower blade, the cutting assembly receiving grass clippings cut by the mower blade, the cutting assembly including compression means for compressing and cutting the grass clippings; and a separation chamber and a forced air system, said forced air system directing forced air and grass clippings produced by the lawnmower into the separation chamber, wherein the forced air is separated from the grass clippings, wherein said separation chamber includes a cylindrical container having an upper end, a lower end, and a sidewall extending therebetween, said sidewall defining a forced air inlet receiving the forced air and grass clippings from at least one of the mower deck and a blower, said upper end defining a forced air outlet, said lower end defining a grass clippings outlet, said cutting assembly positioned adjacent said lower end.

\* \* \* \* \*